(12) United States Patent
Soomro et al.

(10) Patent No.: US 8,605,691 B2
(45) Date of Patent: Dec. 10, 2013

(54) ENHANCED SITE REPORT BY LOW LATENCY ROAMING BY PASSIVE SCANNING IN IEEE 802.11 NETWORKS

(75) Inventors: Amjad Soomro, Hopewell Junction, NY (US); Zhun Zhong, Croton-on-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 581 days.

(21) Appl. No.: 11/571,841

(22) PCT Filed: Jul. 7, 2005

(86) PCT No.: PCT/IB2005/052270
§ 371 (c)(1),
(2), (4) Date: Jan. 9, 2007

(87) PCT Pub. No.: WO2006/006137
PCT Pub. Date: Jan. 19, 2006

(65) Prior Publication Data
US 2008/0095125 A1 Apr. 24, 2008

Related U.S. Application Data

(60) Provisional application No. 60/586,946, filed on Jul. 9, 2004, provisional application No. 60/635,684, filed on Dec. 13, 2004.

(51) Int. Cl.
*H04W 4/00* (2009.01)
(52) U.S. Cl.
USPC ...... 370/338; 370/310.2; 370/328; 455/432.1
(58) Field of Classification Search
USPC ........ 455/432.1–455, 464, 435.2, 435.3, 437, 455/418–422.1, 550.1, 552.1, 553.1, 556.1, 455/556.2; 370/319–331, 335–338, 370/341–348, 320, 310.2, 352–356, 370/441–443, 466–480, 491, 500
See application file for complete search history.

(56) References Cited

U.S. PATENT DOCUMENTS

| | | | | |
|---|---|---|---|---|
| 5,960,344 | A * | 9/1999 | Mahany | 455/432.2 |
| 6,332,077 | B1 * | 12/2001 | Wu et al. | 455/432.1 |
| 7,146,130 | B2 * | 12/2006 | Hsu et al. | 455/3.04 |
| 7,260,395 | B1 * | 8/2007 | Hughes et al. | 455/432.2 |

(Continued)

FOREIGN PATENT DOCUMENTS

WO 2004036846 A 4/2004

OTHER PUBLICATIONS

IEEE Std 802.11g, 2003.*

(Continued)

*Primary Examiner* — San Htun
(74) *Attorney, Agent, or Firm* — Larry Liberchuk

(57) ABSTRACT

In order to reduce the average wait time, information regarding regulatory domain, a component of channel availability, may be obtained through an apparatus and method for transmitting within available channels in a wireless network. This includes determining available channels in a wireless network by: receiving regulatory domain information within the wireless network; generating a frame with at least one component corresponding to the regulatory domain information; transmitting the frame unsolicited by a beacon; receiving the report at a station; and determining whether a channel is available for transmission based, at least in part, on the component corresponding to the regulatory domain information contained in the frame.

10 Claims, 6 Drawing Sheets

(56) References Cited

U.S. PATENT DOCUMENTS

| | | | |
|---|---|---|---|
| 2002/0188723 A1* | 12/2002 | Choi et al. | 709/225 |
| 2003/0181215 A1 | 9/2003 | Cromer | |
| 2004/0039817 A1* | 2/2004 | Lee et al. | 709/225 |
| 2004/0127240 A1 | 7/2004 | Li | |
| 2004/0137905 A1* | 7/2004 | Jeong et al. | 455/450 |

OTHER PUBLICATIONS

"IEEE 802.11d-2001 Part II Wireless LAN Medium Access Control and Physical Layer Specifications: Amendment 3: Specification for Operation in Additional Regulatory Domains", Jul. 13, 2001, pp. 1-34.

* cited by examiner

ENHANCED SITE REPORT BY LOW LATENCY ROAMING BY PASSIVE SCANNING IN IEEE 802.11 NETWORKS

This application claims the benefits of provisional application Ser. No. 60/586,946, filed on Jul. 9, 2004, the teachings of which are incorporated herein by reference.

The IEEE 802.11 standard specifies the medium access control (MAC) and physical characteristics for a wireless local area network (WLAN) to support physical layer units. The IEEE 802.11 standard is defined in International Standard ISO/IEC 8802-11, "Information Technology—Telecommunications and Information Exchange Area Networks," 1999 Edition [1], which is hereby incorporated by reference as if fully set forth herein. The following supplements to 802.11 are also herein incorporated by reference: IEEE 802.11h, IEEE TGk draft D 0.14, and IEEE TGe draft D8.0.

In certain regulatory domains, a station (STA) is not allowed to transmit frames in certain frequency bands until it determines that no radar exists in the band of interest, or it has been informed that radars of interest are not detected by an access point (AP). If the AP finds radar, it will report to the station, which will then shut the network in that channel and move to another channel. This movement is performed following 802.11 channel scanning procedure.

IEEE TGk, previously incorporated by reference, provides for WLAN roaming capability. This limits provides for scanning for radar to a fixed number of channels, i.e., the system will scan channels in a certain range that are permitted. To assist the system in scanning, it contains a report such as a Site Report or Neighbor Report collected from the APs that says which channels are available in the station's neighborhood. This reduces the amount of scanning required to determine available channels and minimizes a lag in transmission time.

Stations may have no capacity to detect radar themselves. In such regulatory domains, stations perform passive scanning to wait for beacons from access points. The beacons are transmitted at regular fixed intervals of time and are normally spaced farther apart for networking efficiency reasons. The beacons contain information whether a radar is present in an channel or not. This has the drawback that when a station switches channels during roaming, it cannot transmit until it scans for radar or listens for beacons that contain radar information. This scanning for radar and/or listening for beacons leads to longer average wait times for stations performing passive scanning, up to one beacon period per scanned channel.

Thus, in order to reduce the average wait time, information regarding radar presence, a component of channel availability, must be obtained through alternate means.

The present invention is directed to an apparatus and method for determining available channels in a wireless network. In one aspect, one method for transmitting within available channels in a wireless network includes the steps of: receiving regulatory domain information within the wireless network; generating at least one protocol frame comprising at least one component corresponding to said regulatory domain information; transmitting said at least one protocol frame; receiving said at least one protocol frame; and determining whether a channel is available for transmission based, at least in part, on said component corresponding to said regulatory domain information, wherein the transmitting step occurs unsolicited.

In one embodiment, the receiving step includes receiving regulatory domain information on a system level. In another embodiment, the receiving step includes receiving the regulatory domain information wirelessly, through a wired system, or both.

In one embodiment, the transmitting step includes transmitting the report at an interval of time shorter than the interval of time between subsequent beacon transmissions. In another embodiment, the transmitting step includes transmitting the report independent of beacon transmissions. In another embodiment, the transmitting step includes transmitting the report from an AP when solicited by a STA. In another embodiment, the transmitting step includes an unsolicited transmission of the report.

In one embodiment, the method includes transmitting in the channel based on the determining step.

In another embodiment, the report includes information on a collection of APs that are candidates to which an STA can roam. In another embodiment, the report includes information on a collection of APs that are candidates to which an STA would prefer to roam.

In one embodiment, the generating step includes generating a report including at least one component corresponding to said regulatory domain information and at least one component corresponding to radar presence.

In one embodiment, the determining step includes determining whether a channel is available for transmission based, at least in part, on a component corresponding to regulatory domain information and a component corresponding to radar presence contained in said report.

In one aspect, a system for transmitting within available channels in a wireless network includes: a memory containing regulatory domain information; a transmission device for transmitting the regulatory domain information within the wireless network; a receiver for receiving the regulatory domain information; a frame generator which generates a frame containing at least one component corresponding to regulatory domain information; a transmitter for transmitting the frame unsolicited; a STA for receiving said report; and a processor for determining whether a channel is available for transmission based, at least in part, on the component corresponding to regulatory domain information contained in the report.

Figure 1:
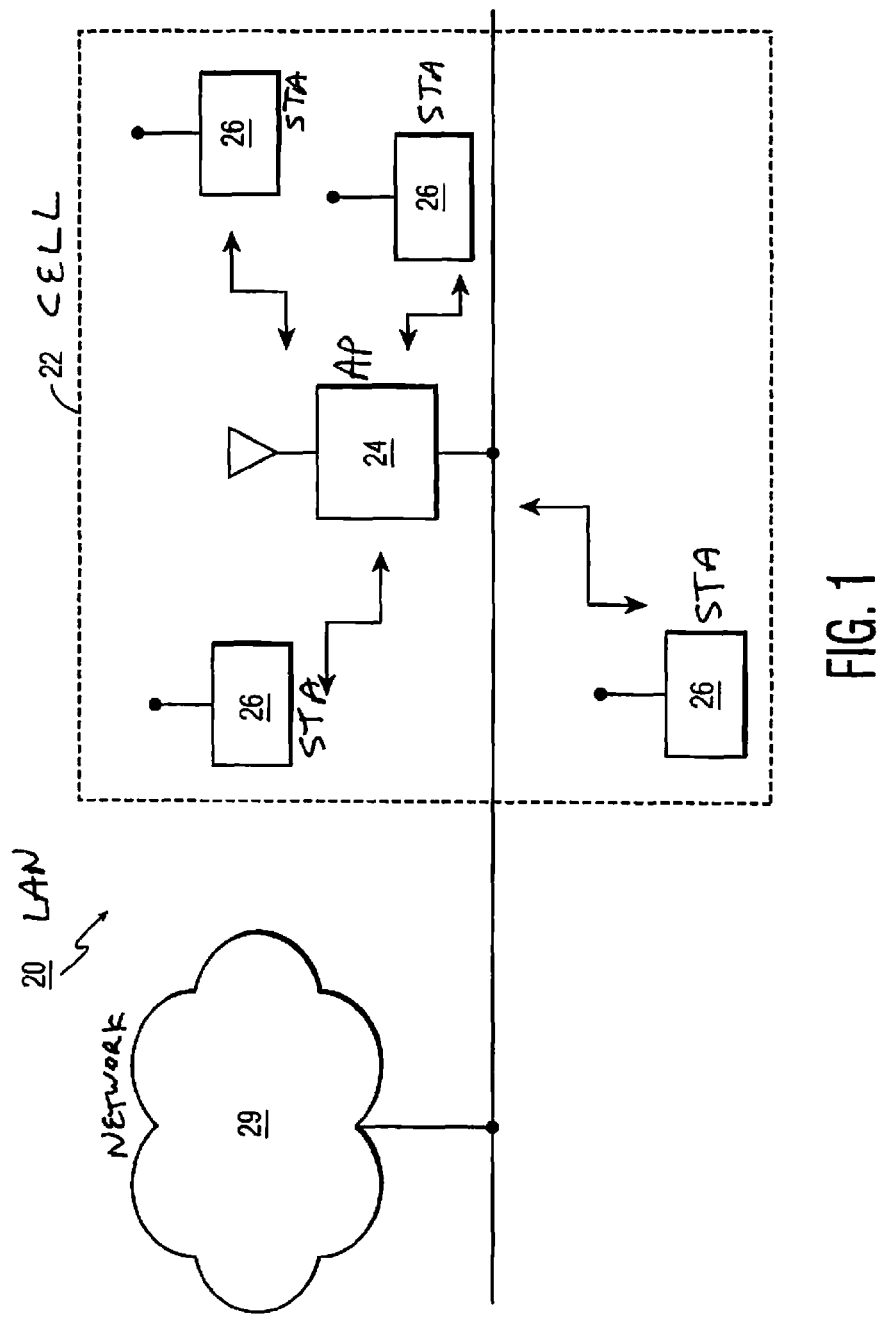
FIG. 1 depicts a WLAN.

FIG. 1 illustrates a wireless LAN (WLAN) 20 system for implementing the method of the invention. Wireless LAN 20 defines an infrastructure network which includes a plurality of cells 22. Cell 22 includes an access point (AP) 24 (which is sometimes referred to as a wireless local bridge or a base station).

With continued reference to FIG. 1, cell 22 may include remote network stations (STAs) 26. Access point 24 and remote STAs 26 may be the transmitters and receivers of the system. Each STA 26 may be a mobile, portable, or stationary terminal. Each STA 26 may be a desktop workstation, laptop computer, palm top computer, handheld personal computer, pen-based computer, personal digital assistant, handheld scanner, data collector, handheld printer, etc.

If present, AP 24 may be an interface for communicating between wireless network 20 and a wireline network. AP 24 may be configured to provide a communications gateway between STAs 26 and AP 24 that are in cell 22 and also between a wireline network and the STAs 26. AP 24 is typically configured to convert signals between wireline and wireless communications mediums. The conversion may allow the access point to pass communication information between the wireline network and wireless STAs 26. The wireline network may be coupled to an external network (e.g., PBX, PSTN, Internet, etc.).

Figure 2:
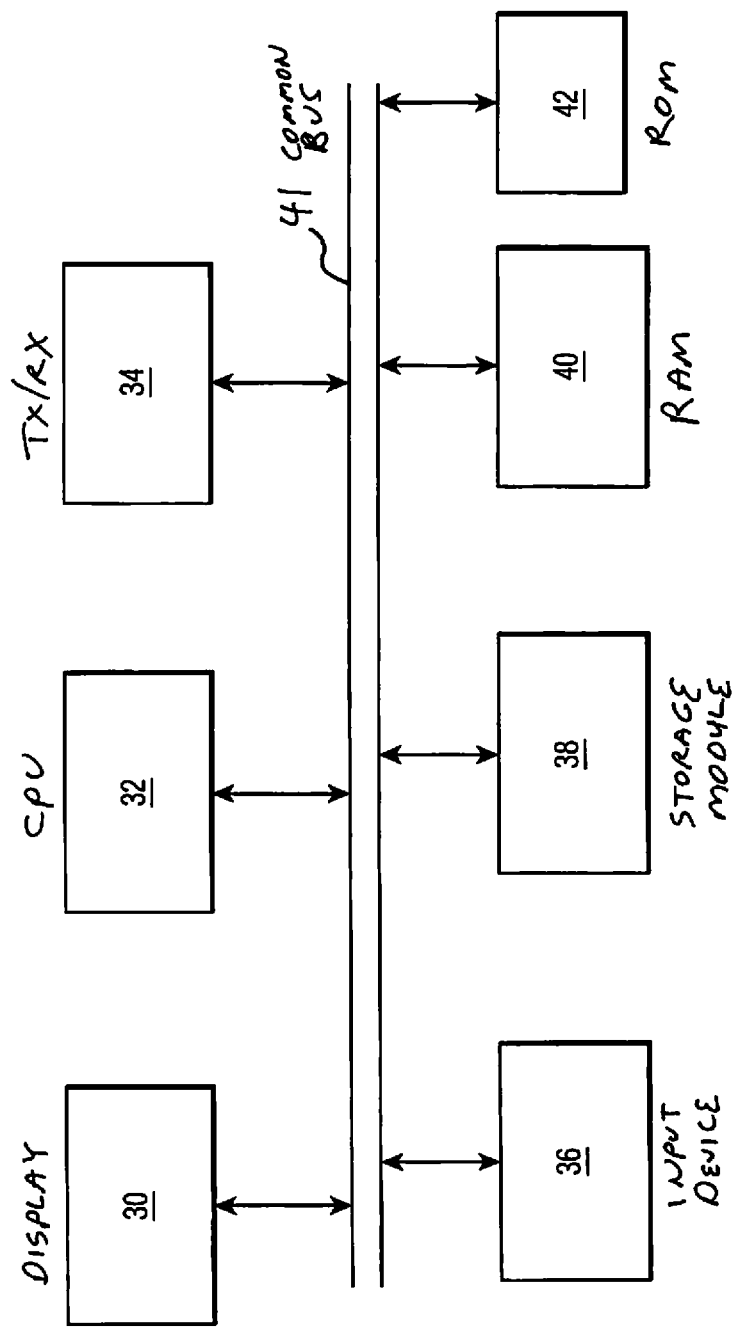
FIG. 2 illustrates a simplified block diagram of an access point (AP) and each station (STA) within a cell.

Referring now to FIG. 2, both the AP 24 and STAs 26 may include a display 30, a CPU 32, a transmitter/receiver 34, an input device 36, a storage module 38, a random access memory (RAM) 40, a read-only memory (42), and a common bus 41. Although the description may refer to terms commonly used in describing particular computer systems, the description and concepts equally apply to other processing systems, including systems having architectures dissimilar to that shown in FIG. 2. The transmitter/receiver 34 is coupled to an antenna (not shown) to transmit desired data and its receiver converts received signals into corresponding digital data. The CPU 32 operates under the control of an operating system contained in the ROM 42 and utilizes RAM 40 to perform the frequency selection within a wireless local area network (WLAN), by enabling the AP in an infrastructure network or a STA in an ad-hoc network, to provide a new channel or wireless link for the rest of stations (STAs).

In operation, in a typical 802.11 based wireless local area network (WLAN), such as wireless LAN 20 of FIG. 1, a plurality of STAs 26 may be associated with AP 24 if present. Each STA 26 may have different communications capabilities and requirements. AP 24 may manage the communications traffic between STAs 26 and the wireline network. AP 24 may manage the communications traffic by controlling when frames are transmitted to each remote STA 26 in cell 22. The communications traffic in cell 22 may include data frames (e.g., signals that carry frames to provide data communications), voice frames (e.g., signals that carry frames to provide voice communications), real-time frames (e.g., signals that carry frames to provide real-time communications such as multimedia or voice communications), management frames (e.g., signals that carry frames to provide network management communications), etc.

Figure 3:
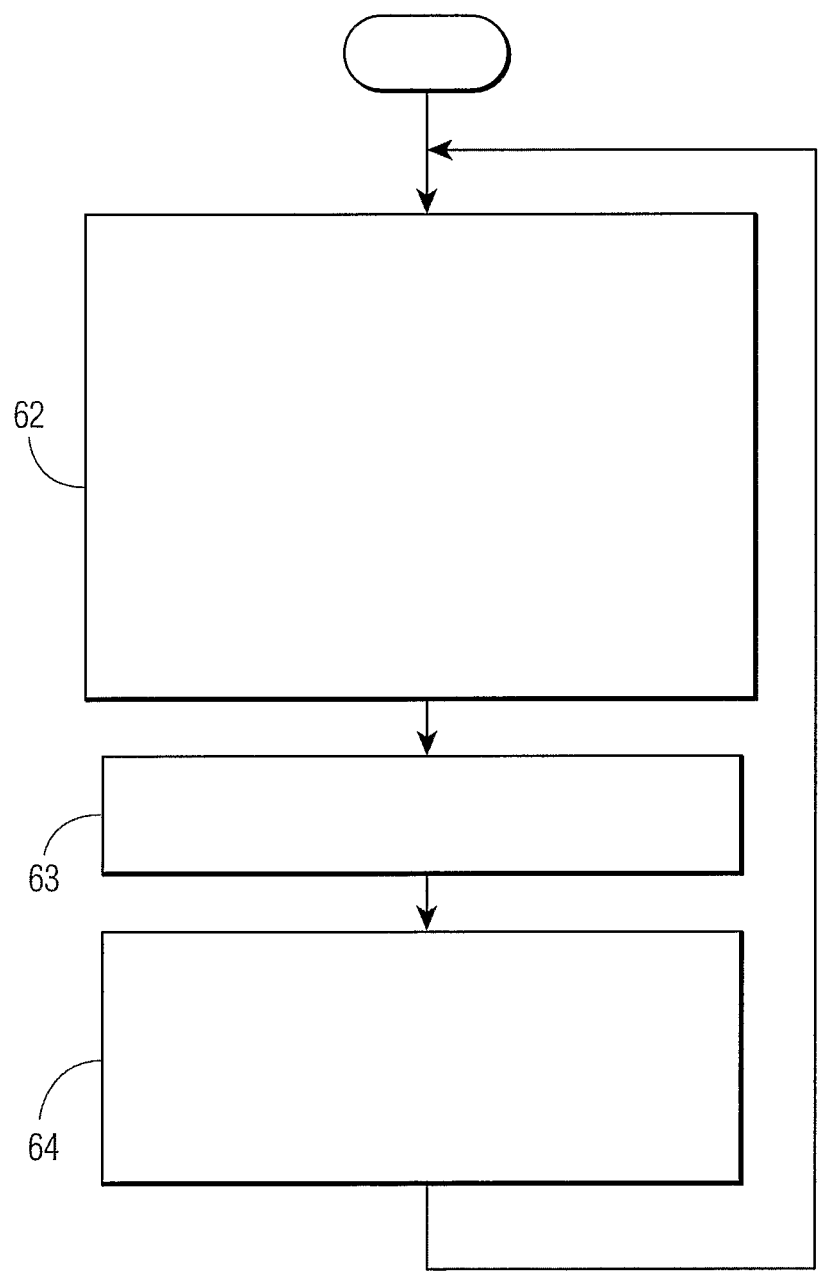
FIG. 3 is a flowchart of a method of transmitting probe response frames.

AP 24 may broadcast or transmit a probe response frame in between beacons. Regulatory domain information may be included in and conveyed with the probe response frame. This method occurs in one example according to FIG. 3. FIG. 3 depicts a process flowchart at AP for low latency scanning using regulatory information frames. In this illustrative example, in step 62, an AP collects the regulatory information about the channel it is operating in and about the channel in which other APs are operating. The AP could collect this information by doing measurements on the channels, by retrieving regulatory information from a local database or by application of regulatory rules on the results of the radio measurement. The AP could also get the regulatory information through a wired network or through a wireless network. The AP then generates a frame with regulatory information in it in step 63. The AP then transmits the frame independent of the regular beacons in step 64. The AP could, for example, transmit this frame either upon request by a STA or it could transmit to at least one STA unsolicited.

Figure 4:
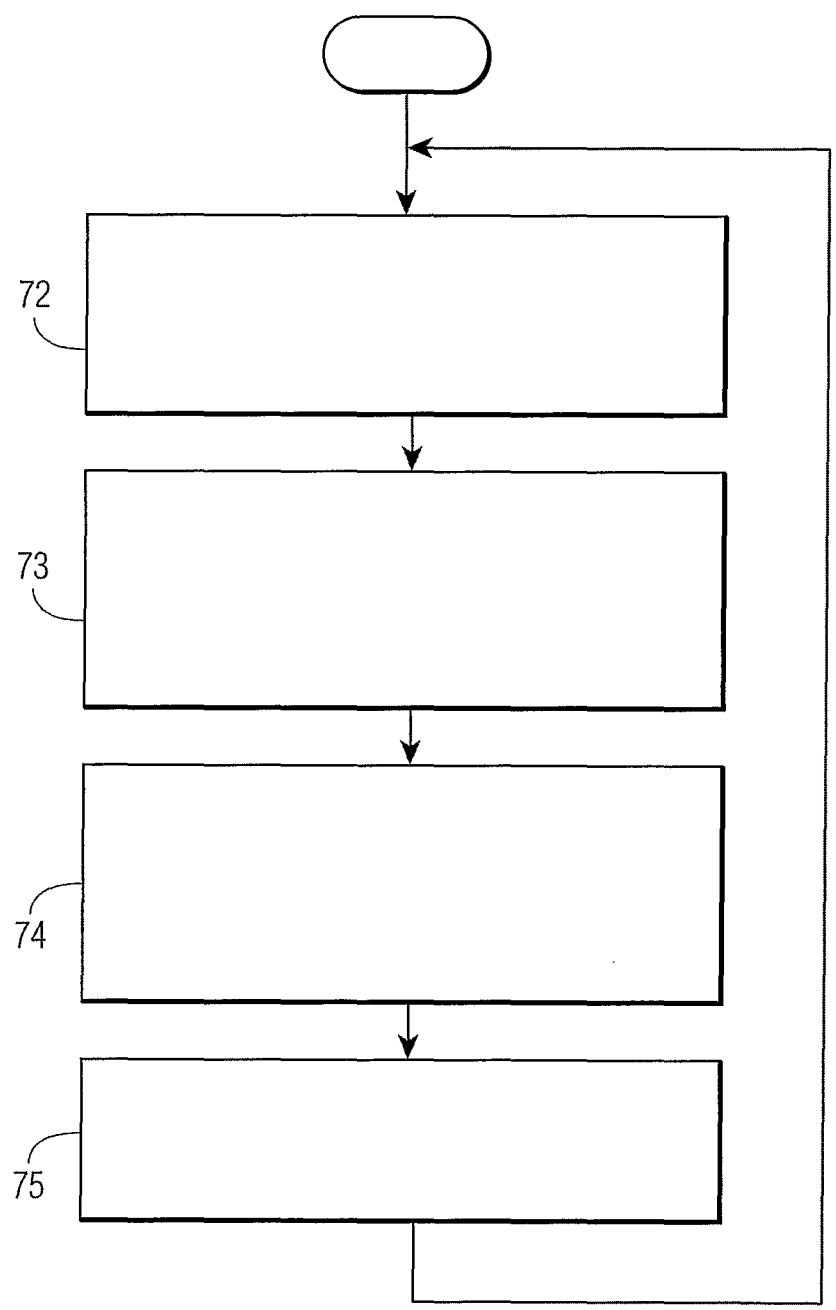
FIG. 4 is a flowchart depicting low latency scanning using regulatory information frames.

FIG. 4 depicts a process flowchart of an additional example of at STA for low latency scanning using regulatory information frames. In this illustrative example, a STA requests some regulatory information about at least one AP in the same or other channels in step 72. This step is optional and a STA may not do this step. When an AP transmits a frame containing regulatory information, as stated in the previous paragraph, the STA receives this information in step 73 and decides based, at least in part, on the received information which AP to associate with, re-associate with, roam to or stay with the current AP in step 74. If a STA decides to roam to an AP about which it received information from the AP in the report, it then starts association or re-association process with that AP in step 75.

Figure 5:
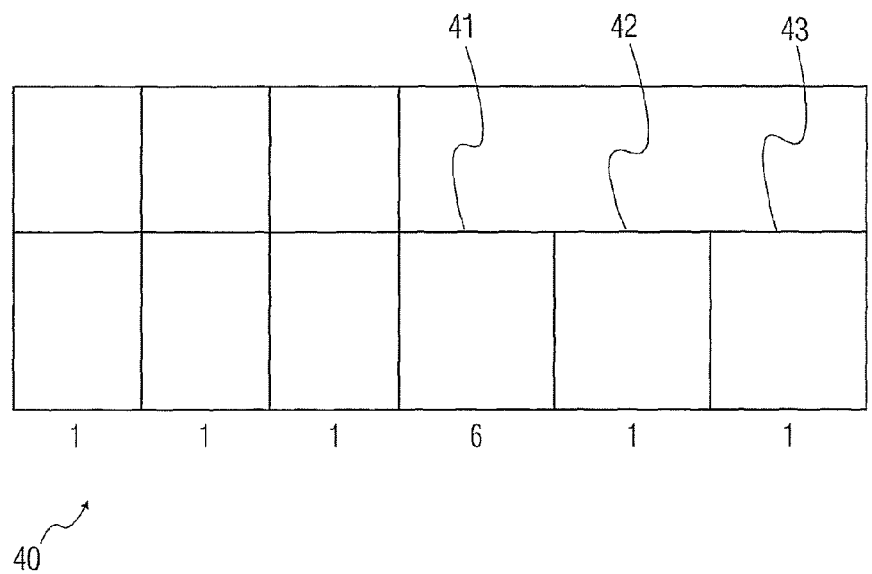
FIG. 5 depicts an example of a protocol frame format.
Figure 6:
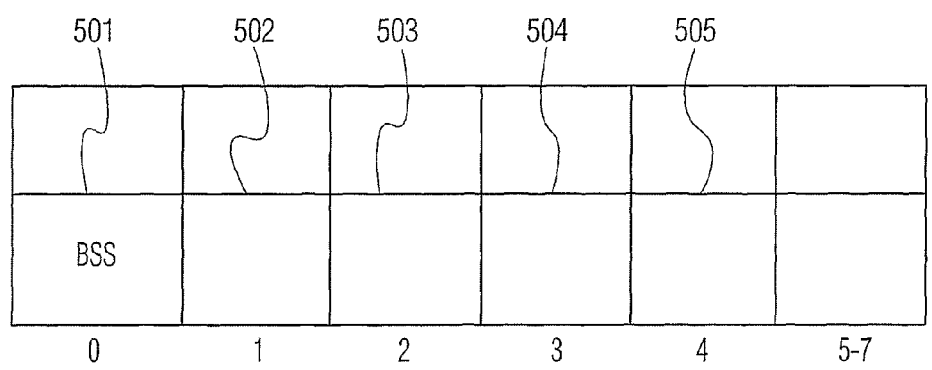
FIG. 6 depicts an example of a map/detected field format.

FIG. 5 depicts an example of a protocol frame 40 which has the information needed to allow stations to begin transmissions. This protocol frame 40 may be broadcast one or more times, unsolicited, between regularly spaced beacons. The protocol frame 40 contains, for example, three information fields. The fields are Country 41, Local Power Constraint 42, and Map/Detected Signal Map 43. The definition of Country 41, Local Power Constraint 42, and Map/Detected Signal Map 43 follows the definitions defined in IEEE 802.11 2003 edition herein incorporated by reference. Map/Detected Signal Map 43 can be coded as a bit field. FIG. 6 depicts a Map/Detected Signal Map 43 that contains a BSS bit 501, an OFDM Preamble bit 502, an Unidentified Signal bit 503, a Radar bit 504, and an Unmeasured bit 505.

Figure 7:
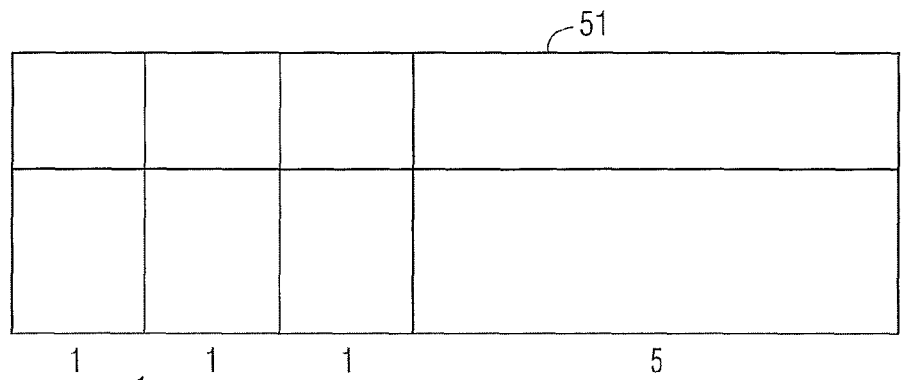
FIG. 7 depicts an example of a protocol frame format.
Figure 8:
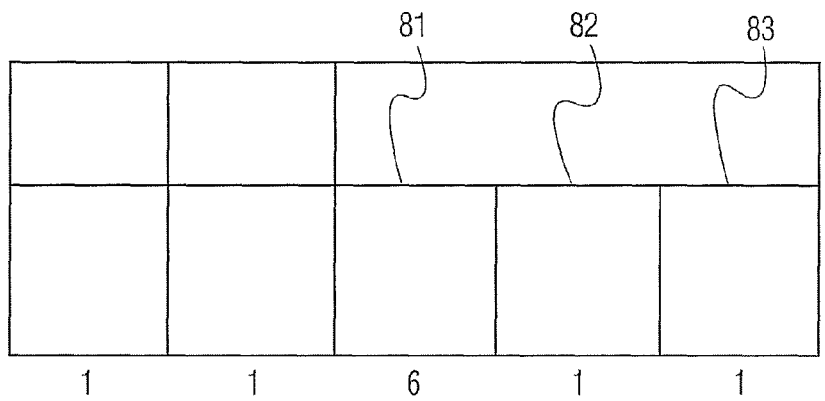
FIG. 8 depicts and example of a Regulatory Domain Information Element.

FIG. 7 depicts an alternate protocol frame 50. In protocol frame 50, the Country, Local Power Constraint, and Map/Detected Signal Map fields are combined as in information element, called Regulatory Domain Information Element 51. FIG. 8 shows the Regulatory Domain Information Element 51 as a field format 80 that contains the information field of Country 81, Local Power Constraint 82, and Map/Detected Signal Map 83.

Figure 9:
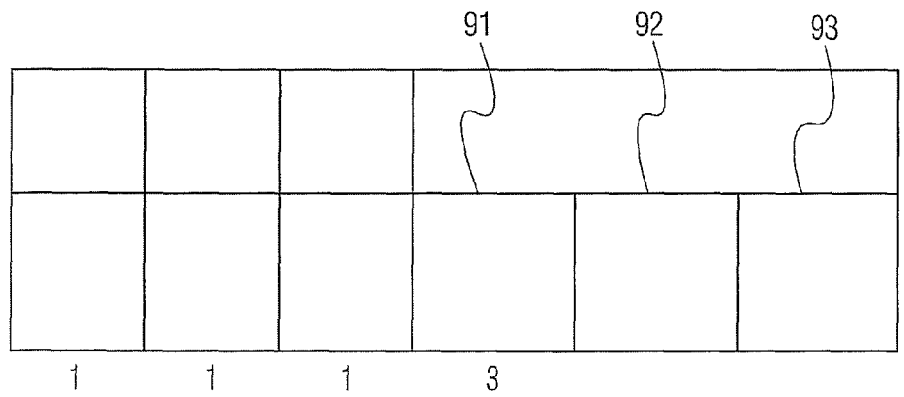
FIG. 9 depicts an example of a Regulatory Domain Information Element field format.

FIG. 9 depicts a protocol frame which has three distinct information elements: Power Constraint Information Element 91, Country Information Element 92, and Measurement Report Element 93, each defined in 802.11 2003 edition previously incorporated by reference. This protocol frame may be broadcast one or more times, unsolicited, between beacons.

In each of protocol frames 40, 50, 80, and 90, a subset of the information elements, the fields, the bits within the fields, or a combination thereof could be used to form the protocol frame. Field lengths can be made fixed or variable, or the byte count changed to accommodate different ranges of information according to methods and techniques commonly known in the art.

The present invention has been described with respect to particular illustrative embodiments. It is to be understood that the invention is not limited to the above-described embodiments and modifications thereto, and that those of ordinary skill in the art may make various changes and modifications without departing from the spirit and scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

What is claimed is:

1. A method for transmitting within available channels in a wireless network that comprises at least a first station and a second station, the method comprising:

receiving, by the first station, regulatory information within the wireless network;

generating, by the first station, at least one protocol frame comprising at least one component corresponding to the received regulatory information and at least one component corresponding to radar presence;

transmitting, by the first station, at an interval of time shorter than the interval of time between subsequent beacon transmissions, the at least one protocol frame comprising the at least one component corresponding to said received regulatory information and the at least one component corresponding to radar presence;

receiving, by the second station, said at least one protocol frame comprising the at least one component corresponding to said received regulatory information and the at least one component corresponding to radar presence; and determining, by the second station, an access point to associate with, re-associate with, or to roam to and whether a channel is available for transmission based in part, on the component corresponding to said regulatory information and the component corresponding to radar presence received in the at least one protocol frame, wherein the transmitting, by the first station, occurs unsolicited and independent of beacon transmissions.

2. The method of claim 1, wherein the receiving, by the first station, further comprises receiving regulatory information on a system level.

3. The method of claim 1, wherein the receiving, by the first station, further comprises receiving the regulatory information wirelessly, through a wired system, or both.

4. The method of claim 1, wherein the transmitting, by the first station, further comprises transmitting the protocol frame from an access point when solicited by a station.

5. The method of claim 1, wherein the receiving, by the first station, regulatory information includes collecting the regulatory information about a channel in which the access point is operating in and about a channel in which other access points are operating in.

6. The method of claim 1, further comprising transmitting, by the first station, in the channel based on the determining.

7. The method of claim 1, wherein the protocol frame further comprises information on a collection of access points that are candidates to which a station can roam.

8. The method of claim 1, wherein the protocol frame further comprises information on a collection of access points that are candidates to which a station would prefer to roam.

9. The method of claim 1, wherein the regulatory information includes regulatory domain information comprising the fields of country, local power constraint, and map/detected signal map.

10. A system for transmitting within available channels in a wireless network comprising at least a first station and a second station, wherein the first station comprises:
a memory containing regulatory information;
a transmission device for transmitting the regulatory information within the wireless network;
a receiver for receiving the regulatory information;
a frame generator which generates a frame containing at least one component corresponding to said received regulatory information and at least one component corresponding to radar presence; and
a transmitter for transmitting said frame containing at least one component corresponding to said received regulatory information and at least one component corresponding to radar presence, unsolicited and independent of beacon transmissions and at an interval of time shorter than the interval of time between subsequent beacon transmissions;

wherein the second station comprises:
a receiver for receiving said frame; and
a processor for determining an access point to associate with, re-associate with, or to roam to and whether a channel is available for transmission based in part, on said component corresponding to said regulatory information contained in a received frame and said component corresponding to radar presence.

* * * * *